US012216418B2

(12) United States Patent
Kawashima et al.

(10) Patent No.: US 12,216,418 B2
(45) Date of Patent: Feb. 4, 2025

(54) POWDER CONVEYANCE DEVICE AND IMAGE FORMING APPARATUS INCLUDING A CONVEYOR AND FIRST AND SECOND CONVEYANCE TUBES

(71) Applicants: Naohiro Kawashima, Kanagawa (JP); Kei Saito, Tokyo (JP)

(72) Inventors: Naohiro Kawashima, Kanagawa (JP); Kei Saito, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/379,185

(22) Filed: Oct. 12, 2023

(65) Prior Publication Data

US 2024/0126189 A1 Apr. 18, 2024

(30) Foreign Application Priority Data

Oct. 14, 2022 (JP) ................................ 2022-165449

(51) Int. Cl.
*G03G 15/08* (2006.01)

(52) U.S. Cl.
CPC ................................ *G03G 15/0891* (2013.01)

(58) Field of Classification Search
USPC ......................................................... 399/256
See application file for complete search history.

(56) References Cited

U.S. PATENT DOCUMENTS

2009/0324294 A1* 12/2009 Ichikawa ........... G03G 15/0877 399/258
2022/0317595 A1 10/2022 Yoshizawa et al.

FOREIGN PATENT DOCUMENTS

JP 2002-311712 A 10/2002
JP 2018-066872 A 4/2018

* cited by examiner

*Primary Examiner* — Quana Grainger
(74) *Attorney, Agent, or Firm* — XSENSUS LLP

(57) ABSTRACT

A powder conveyance device includes a conveyor that rotates in a rotation direction to convey powder and a first conveyance tube accommodating the conveyor. A second conveyance tube extends in an angled direction that is angled with respect to the first conveyance tube. The second conveyance tube communicates with the first conveyance tube. A swing member is disposed inside the second conveyance tube. The swing member swings in accordance with rotation of the conveyor. The swing member has one end that is detachably attached to the conveyor. The one end is detached from the conveyor in a detaching direction. A restrictor is disposed inside one of the first conveyance tube and the second conveyance tube. The restrictor restricts motion of the swing member in the detaching direction.

18 Claims, 7 Drawing Sheets

POWDER CONVEYANCE DEVICE AND IMAGE FORMING APPARATUS INCLUDING A CONVEYOR AND FIRST AND SECOND CONVEYANCE TUBES

CROSS-REFERENCE TO RELATED APPLICATION

This patent application is based on and claims priority pursuant to 35 U.S.C. § 119(a) to Japanese Patent Application No. 2022-165449, filed on Oct. 14, 2022, in the Japan Patent Office, the entire disclosure of which is hereby incorporated by reference herein.

BACKGROUND

Technical Field

Embodiments of this disclosure relate to a powder conveyance device and an image forming apparatus, and more particularly, to a powder conveyance device for conveying powder such as toner and waste toner and an image forming apparatus incorporating the powder conveyance device.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data by electrophotography.

Such image forming apparatuses include a powder conveyance device that conveys powder such as toner and waste toner. The powder conveyance device includes a first conveyance path and a second conveyance path that intersects the first conveyance path. The second conveyance path is provided with a swing member.

SUMMARY

This specification describes below an improved powder conveyance device. In one embodiment, the powder conveyance device includes a conveyor that rotates in a rotation direction to convey powder and a first conveyance tube accommodating the conveyor. A second conveyance tube extends in an angled direction that is angled with respect to the first conveyance tube. The second conveyance tube communicates with the first conveyance tube. A swing member is disposed inside the second conveyance tube. The swing member swings in accordance with rotation of the conveyor. The swing member has one end that is detachably attached to the conveyor. The one end is detached from the conveyor in a detaching direction. A restrictor is disposed inside one of the first conveyance tube and the second conveyance tube. The restrictor restricts motion of the swing member in the detaching direction.

This specification further describes an improved image forming apparatus. In one embodiment, the image forming apparatus includes a developing device that forms an image and the powder conveyance device described above that conveys powder to the developing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
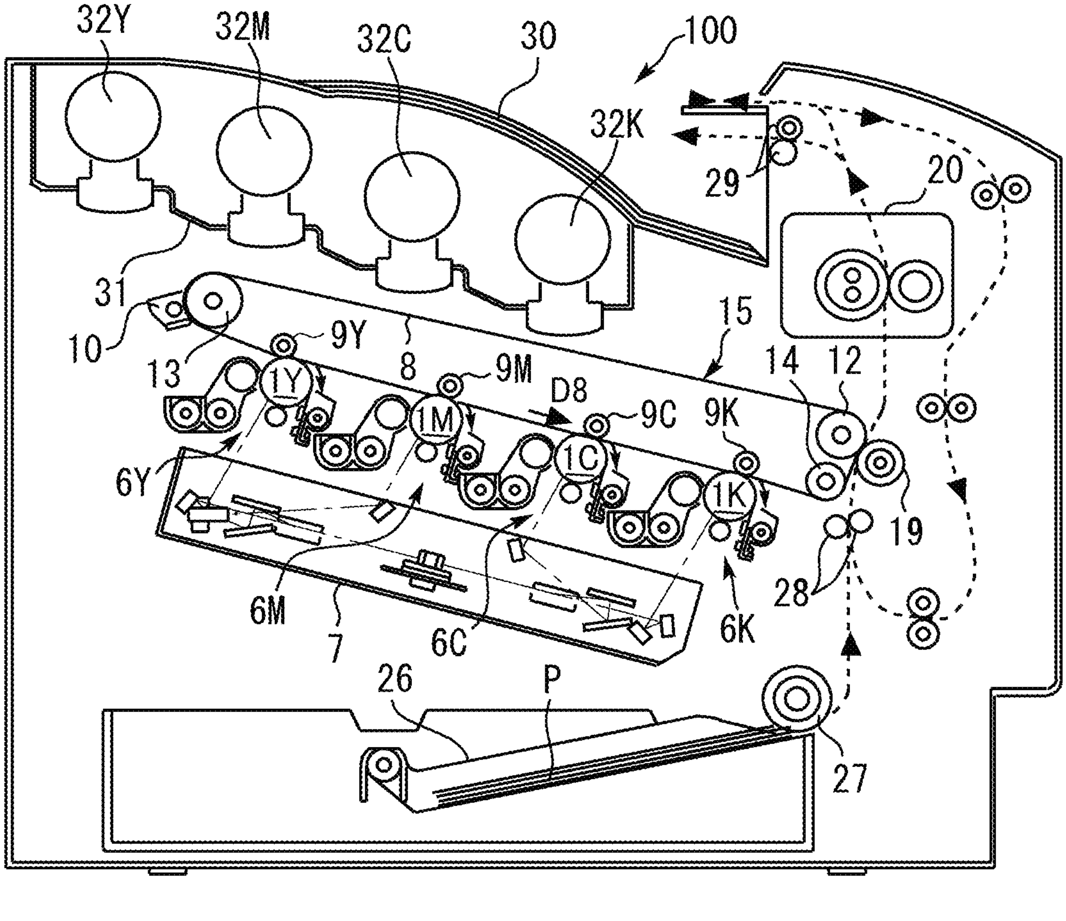
FIG. 1 is a cross-sectional view of an image forming apparatus according to an embodiment of the present disclosure, illustrating an entire construction of the image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to drawings, a detailed description is provided of embodiments of the present disclosure. In the drawings, identical reference numerals are assigned to identical elements and equivalents and redundant descriptions of the identical elements and the equivalents are summarized or omitted properly.

Figure 2:
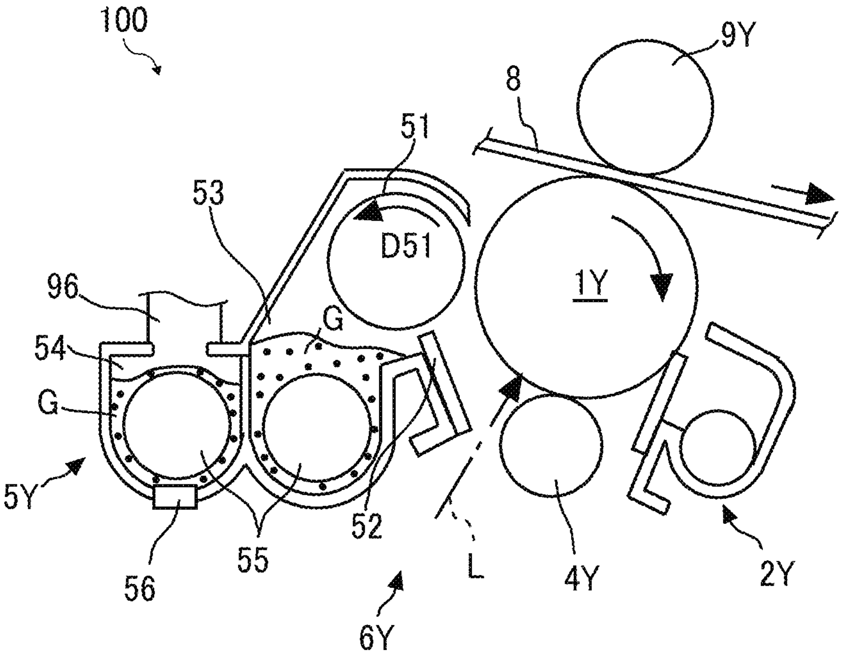
FIG. 2 is a cross-sectional view of an image forming device incorporated in the image forming apparatus depicted in FIG. 1.
Figure 3:
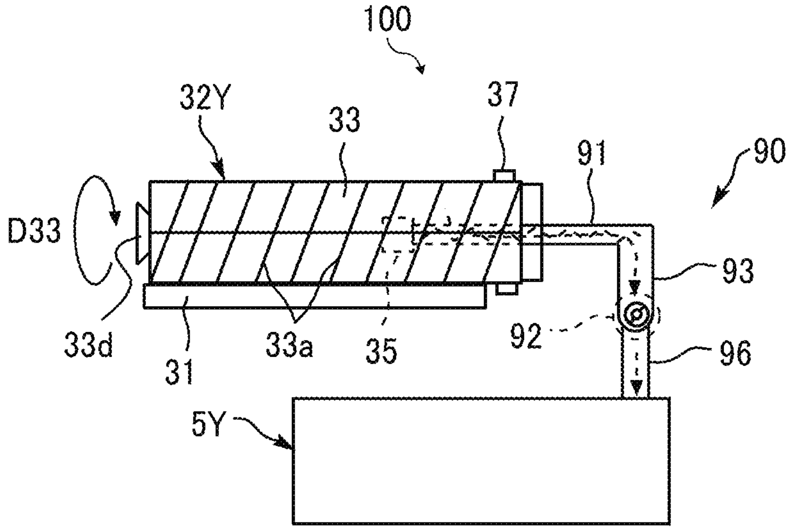
FIG. 3 is a diagram of a toner supply device serving as a powder conveyance device incorporated in the image forming apparatus depicted in FIG. 1 and peripheral elements of the toner supply device, illustrating an entire construction of the toner supply device.

Referring to FIGS. 1 to 3, a description is provided of an entire construction and operations of an image forming apparatus 100.

FIG. 1 is a cross-sectional view of the image forming apparatus 100, that is, a printer. FIG. 2 is an enlarged view of an image forming device incorporated in the image forming apparatus 100. FIG. 3 is a diagram of a toner supply device serving as a powder conveyance device incorporated in the image forming apparatus 100 and peripheral elements of the toner supply device.

As illustrated in FIG. 1, the image forming apparatus 100 includes a mount 31 (e.g., a toner container mount) that is disposed in an upper portion of an apparatus body of the image forming apparatus 100. The mount 31 detachably or replaceably mounts toner containers 32Y, 32M, 32C, and 32K that contain toner in four colors, that is, yellow, magenta, cyan, and black, respectively. Each of the toner containers 32Y, 32M, 32C, and 32K is substantially tubular.

The image forming apparatus 100 further includes an intermediate transfer unit 15 that is disposed below the mount 31. The intermediate transfer unit 15 includes an intermediate transfer belt 8. The image forming apparatus 100 further includes image forming devices 6Y, 6M, 6C, and 6K that form yellow, magenta, cyan, and black toner images, respectively, and are aligned. The image forming devices 6Y, 6M, 6C, and 6K are disposed opposite the intermediate transfer belt 8.

As illustrated in FIG. 2, the image forming device 6Y that forms the yellow toner image includes a photoconductive drum 1Y serving as an image bearer. The photoconductive drum 1Y is surrounded by a charger 4Y, a developing device 5Y, a cleaner 2Y, a discharger, and the like. Image forming processes (e.g., a charging process, an exposure process, a developing process, a primary transfer process, a cleaning process, and a discharging process) are performed on the photoconductive drum 1Y, forming the yellow toner image on a surface of the photoconductive drum 1Y.

Although other three image forming devices 6M, 6C, and 6K use toners in different colors, respectively, the image forming devices 6M, 6C, and 6K have constructions that are equivalent to a construction of the image forming device 6Y that forms the yellow toner image, thus forming the magenta, cyan, and black toner images, respectively. The following describes the construction of the image forming device 6Y that forms the yellow toner image, properly omitting descriptions of the constructions of the three image forming devices 6M. 6C, and 6K, respectively.

As illustrated in FIG. 2, a motor drives and rotates the photoconductive drum 1Y serving as a photoconductor clockwise in FIG. 2. The charger 4Y uniformly charges the surface of the photoconductive drum 1Y at a charging position where the photoconductive drum 1Y is disposed opposite the charger 4Y in the charging process.

Thereafter, a charged portion on the surface of the photoconductive drum 1Y reaches an irradiation position where an exposure device 7 (e.g., a writer) depicted in FIG. 1 irradiates the surface of the photoconductive drum 1Y with a laser beam L. The laser beam L scans and exposes the surface of the photoconductive drum 1Y, forming an electrostatic latent image according to yellow image data in the exposure process.

Thereafter, the electrostatic latent image formed on the surface of the photoconductive drum 1Y reaches a developing position where the photoconductive drum 1Y is disposed opposite the developing device 5Y. The developing device 5Y develops the electrostatic latent images into a yellow toner image in the developing process.

Thereafter, the yellow toner image formed on the surface of the photoconductive drum 1Y reaches a primary transfer position where the photoconductive drum 1Y is disposed opposite a primary transfer roller 9Y via the intermediate transfer belt 8. At the primary transfer position, the primary transfer roller 9Y primarily transfers the yellow toner image formed on the surface of the photoconductive drum 1Y onto the intermediate transfer belt 8 in the primary transfer process. After the primary transfer process, a slight amount of residual toner that is failed to be transferred onto the intermediate transfer belt 8 remains on the photoconductive drum 1Y.

Thereafter, a transfer portion on the surface of the photoconductive drum 1Y from which the yellow toner image has been transferred onto the intermediate transfer belt 8 reaches a cleaning position where the photoconductive drum 1Y is disposed opposite the cleaner 2Y. At the cleaning position, the cleaner 2Y collects the residual toner failed to be transferred onto the intermediate transfer belt 8 and therefore remaining on the surface of the photoconductive drum 1Y in the cleaning process.

Finally, a cleaned portion on the surface of the photoconductive drum 1Y reaches a discharging position where the photoconductive drum 1Y is disposed opposite the discharger. At the discharging position, the discharger removes residual potential on the photoconductive drum 1Y.

Thus, a series of image forming processes performed on the photoconductive drum 1Y finishes.

Each of the image forming devices 6M, 6C, and 6K also performs the image forming processes described above similarly to the image forming device 6Y that forms the yellow toner image. For example, the exposure device 7 disposed below the image forming devices 6Y, 6M, 6C, and 6K depicted in FIG. 1 emits laser beams L according to the yellow, magenta, cyan, and black image data onto photoconductive drums 1Y, 1M, 1C, and 1K of the image forming devices 6Y, 6M, 6C, and 6K, respectively. For example, the exposure device 7 includes a light source, a polygon mirror, and a plurality of optical elements. The light source emits the laser beams L. The polygon mirror that is driven and rotated causes the laser beams L to irradiate and scan the surfaces of the photoconductive drums 1Y, 1M, 1C, and 1K through the optical elements, respectively.

Thereafter, the yellow, magenta, cyan, and black toner images formed on the photoconductive drums 1Y, 1M, 1C, and 1K, respectively, in the developing process are primarily transferred onto the intermediate transfer belt 8 such that the yellow, magenta, cyan, and black toner images are superimposed on the intermediate transfer belt 8. Thus, a color toner image is formed on the intermediate transfer belt 8.

As illustrated in FIG. 1, the intermediate transfer unit 15 includes the intermediate transfer belt 8 serving as an intermediate transferor, four primary transfer rollers 9Y, 9M, 9C, and 9K, a secondary transfer opposed roller 12, a cleaning backup roller 13, a tension roller 14, and an intermediate transfer belt cleaner 10. The intermediate transfer belt 8 is stretched taut across and supported by three rollers, that is, the secondary transfer opposed roller 12, the cleaning backup roller 13, and the tension roller 14. One of the three rollers, that is, the secondary transfer opposed roller 12, drives and rotates the intermediate transfer belt 8 in a rotation direction D8.

The four primary transfer rollers 9Y, 9M, 9C, and 9K and the photoconductive drums 1Y, 1M, 1C, and 1K sandwich the intermediate transfer belt 8 to form primary transfer nips between the photoconductive drums 1Y, 1M, 1C, and 1K and the intermediate transfer belt 8, respectively. Each of the primary transfer rollers 9Y, 9M, 9C, and 9K is applied with a transfer bias having a polarity opposite to a polarity of charged toner.

As the intermediate transfer belt 8 rotates in the rotation direction D8, the yellow, magenta, cyan, and black toner images formed on the photoconductive drums 1Y, 1M, 1C, and 1K, respectively, successively pass through the primary transfer nips where the primary transfer rollers 9Y, 9M, 9C, and 9K are pressed against the photoconductive drums 1Y, 1M, 1C, and 1K via the intermediate transfer belt 8, respectively. Accordingly, the primary transfer rollers 9Y, 9M, 9C, and 9K primarily transfer the yellow, magenta, cyan, and black toner images formed on the photoconductive drums 1Y, 1M, 1C, and 1K, respectively, onto the intermediate transfer belt 8 such that the yellow, magenta, cyan, and black toner images are superimposed on the intermediate transfer belt 8.

Thereafter, the yellow, magenta, cyan, and black toner images transferred and superimposed on the intermediate transfer belt 8 reach a secondary transfer position where the intermediate transfer belt 8 is disposed opposite a secondary transfer roller 19. At the secondary transfer position, the secondary transfer opposed roller 12 and the secondary transfer roller 19 sandwich the intermediate transfer belt 8 to form a secondary transfer nip between the secondary transfer roller 19 and the intermediate transfer belt 8. The secondary transfer roller 19 secondarily transfers the yellow, magenta, cyan, and black toner images, that creates the color toner image, formed on the intermediate transfer belt 8 onto a sheet P conveyed to the secondary transfer nip in a secondary transfer process. After the secondary transfer process, residual toner failed to be transferred onto the sheet P remains on the intermediate transfer belt 8.

Thereafter, a transferred portion on the intermediate transfer belt 8, from which the yellow, magenta, cyan, and black toner images have been transferred onto the sheet P, reaches a cleaning position where the intermediate transfer belt 8 is disposed opposite the intermediate transfer belt cleaner 10. At the cleaning position, the intermediate transfer belt cleaner 10 collects the residual toner from the intermediate transfer belt 8.

Thus, a series of transfer processes performed on the intermediate transfer belt 8 finishes.

The sheet P conveyed to the secondary transfer nip is conveyed from a sheet feeder 26 disposed in a lower portion of the apparatus body of the image forming apparatus 100 through a feed roller 27, a registration roller pair 28, and the like.

For example, the sheet feeder 26 loads a plurality of sheets P that is layered in the sheet feeder 26. As the feed roller 27 is driven and rotated counterclockwise in FIG. 1, the feed roller 27 feeds an uppermost sheet P to a roller nip formed between rollers of the registration roller pair 28.

The registration roller pair 28 (e.g., a timing roller pair) that interrupts rotation temporarily halts the sheet P conveyed to the registration roller pair 28 at the roller nip of the registration roller pair 28. The registration roller pair 28 resumes rotation and conveys the sheet P to the secondary transfer nip so that the sheet P meets the color toner image formed by the yellow, magenta, cyan, and black toner images superimposed on the intermediate transfer belt 8 at the secondary transfer nip. The secondary transfer roller 19 secondarily transfers the color toner image onto the sheet P, thus forming the desired color toner image on the sheet P.

Thereafter, the sheet P transferred with the color toner image at the secondary transfer nip is conveyed to a fixing device 20. The fixing device 20 includes a fixing roller and a pressure roller that form a fixing nip. The fixing roller and the pressure roller fix the color toner image transferred on a surface of the sheet P thereon at the fixing nip under heat and pressure.

Thereafter, the sheet P is ejected onto an outside of the apparatus body of the image forming apparatus 100 through a roller nip of rollers of an output roller pair 29. The sheet P ejected onto the outside of the apparatus body of the image forming apparatus 100 by the output roller pair 29 is stacked on a stacker 30 successively as an output.

Thus, a series of image forming processes (e.g., printing processes) performed by the image forming apparatus 100 finishes.

Referring to FIG. 2, a detailed description is provided of a construction and operations of the developing device 5Y of the image forming device 6Y.

The developing device 5Y serves as a supply destination that is supplied with toner. The developing device 5Y includes a developing roller 51, a doctor blade 52, developer containers 53 and 54, two conveying screws 55, and a density sensor 56. The developing roller 51 is disposed opposite the photoconductive drum 1Y. The doctor blade 52 is disposed opposite the developing roller 51. The developer containers 53 and 54 accommodate the conveying screws 55, respectively. The density sensor 56 detects a toner density of toner contained in a developer. The developing roller 51 includes a magnet that is secured inside the developing roller 51 and a sleeve that rotates around the magnet. Each of the developer containers 53 and 54 contains a two-component developer G made of carriers (e.g., carrier particles) and toner (e.g., toner particles).

A description is provided of operations of the developing device 5Y having the construction described above.

The sleeve of the developing roller 51 rotates in a rotation direction D51. The magnet generates a magnetic field that moves the developer G borne on the developing roller 51 thereon as the sleeve rotates.

The developer G inside the developing device 5Y is adjusted such that a rate (e.g., the toner density) of the toner of the developer G is in a predetermined range. For example, as the toner inside the developing device 5Y is consumed, fresh toner contained in the toner container 32Y is supplied into the developer container 54 through a toner supply device 90 serving as a powder conveyance device depicted in FIG. 3.

Thereafter, while the two conveying screws 55 mix and agitate the fresh toner as powder supplied into the developer container 54 with the developer G, the conveying screws 55 circulate the fresh toner and the developer G inside the two developer containers 53 and 54, moving the fresh toner and the developer G in a longitudinal direction of the conveying screws 55, that is perpendicular to a paper surface of FIG. 2. The toner of the developer G is adhered to the carrier by triboelectric charging and borne on the developing roller 51 with the carrier by a magnetic force generated on the developing roller 51.

The developing roller 51 conveys the developer G borne thereon in the rotation direction D51 depicted in FIG. 2 to a blade opposed position where the developing roller 51 is disposed opposite the doctor blade 52. The doctor blade 52 adjusts an amount of the developer G on the developing roller 51 to an appropriate amount at the blade opposed position. Thereafter, the developing roller 51 conveys the developer G to the developing position where the photoconductive drum 1Y is disposed opposite the developing roller 51. The toner of the developer G is attracted to an electrostatic latent image formed on the photoconductive drum 1Y by an electric field generated at the developing position. Thereafter, as the sleeve of the developing roller 51 rotates, the developer G remaining on the developing roller 51 reaches an upper portion of the developer container 53 and separates from the developing roller 51.

Referring to FIG. 3, a brief description is provided of a construction and operations of the toner supply device 90 serving as the powder conveyance device.

As illustrated in FIG. 3, the toner container 32Y includes a container body 33. The toner supply device 90 serving as the powder conveyance device drives and rotates the container body 33 of the toner container 32Y mounted on the mount 31 in a predetermined rotation direction D33, thus discharging fresh toner serving as powder contained in the toner container 32Y to an outside of the toner container 32Y. The toner supply device 90 includes a first horizontal conveyance path 91 serving as a first conveyance path or a first conveyance tube, a fall path 93 (e.g., a first fall path) serving as a second conveyance path or a second conveyance tube, a second horizontal conveyance path 92, and a conveyance tube 96 through which the fresh toner is guided to the developing device 5Y. Thus, the toner supply device 90 creates a toner supply path (e.g., a toner conveyance path).

The toner containers 32Y, 32M, 32C, and 32K mounted on the mount 31 inside the apparatus body of the image forming apparatus 100 properly supply yellow, magenta, cyan, and black toners into developing devices of the image forming devices 6Y, 6M, 6C, and 6K through four toner supply devices according to amounts of yellow, magenta, cyan, and black toners consumed in the developing devices, respectively. Although the four toner supply devices supply toners in different colors, respectively, that are used for the image forming processes, the four toner supply devices have a substantially common construction.

For example, as illustrated in FIG. 3, when the toner container 32Y is placed on the mount 31 inside the apparatus body of the image forming apparatus 100, a nozzle of the first horizontal conveyance path 91 inside the apparatus body of the image forming apparatus 100 presses and moves a shutter 35 of the toner container 32Y. The first horizontal conveyance path 91 is inserted into the container body 33 of the toner container 32Y through a through-hole 34*a*1 depicted in FIG. 4. Thus, the fresh toner contained in the toner container 32Y is discharged through the first horizontal conveyance path 91.

The toner container 32Y includes a catch 33*d* that is disposed on a bottom (e.g., a left portion in FIG. 3) of the toner container 32Y. The catch 33*d* facilitates attachment and detachment of the toner container 32Y with respect to the mount 31. While a user holds the catch 33*d*, the user attaches the toner container 32Y to the mount 31 and detaches the toner container 32Y from the mount 31.

As illustrated in FIG. 3, the toner container 32Y includes the container body 33 including a groove 33*a*. The groove 33*a* is a spiral that extends in a longitudinal direction parallel to a horizontal direction in FIG. 3 or an axial direction of the container body 33. For example, the groove 33*a*, that is, the spiral, extends from an outer circumferential face to an inner circumferential face of the container body 33. As the container body 33 is driven and rotated, the groove 33*a* conveys the toner (e.g., the fresh toner) inside the container body 33 rightward in FIG. 3. The toner conveyed rightward in FIG. 3 inside the container body 33 is discharged to an outside of the container body 33 through the first horizontal conveyance path 91 serving as the first conveyance path.

The toner supply device 90 further includes a gear 37 that is mounted on the outer circumferential face of the container body 33 at a head (e.g., a right portion in FIG. 3) of the container body 33. The gear 37 meshes with an idler gear 115 of a driver 110 depicted in FIG. 7 that drives the toner supply device 90 inside the apparatus body of the image forming apparatus 100. As the toner container 32Y is attached to the mount 31, the gear 37 mounted on the container body 33 meshes with the idler gear 115 depicted in FIG. 7 inside the apparatus body of the image forming apparatus 100. As a driving motor 111 of the driver 110 depicted in FIG. 7 generates a driving force, the driving force is transmitted to the gear 37 through a gear train, driving and rotating the container body 33.

The construction and the operations of the toner supply device 90 are described below in detail with reference to FIGS. 6, 7, 8, 9A, and 9B.

Referring to FIGS. 4, 5A, 5B, and 5C, a detailed description is provided of a construction of the toner container 32Y, that is common to the toner containers 32M, 32C, and 32K.

FIGS. 4, 5A, 5B, and 5C illustrate a side cross-sectional view of the toner container 32Y. However, FIGS. 4, 5A, 5B, and 5C illustrate the toner container 32Y seen in a direction opposite to a direction in which the toner container 32Y is seen in FIG. 3. That is, the toner container 32Y is inverted laterally.

As described above with reference to FIGS. 1 to 3, the toner container 32Y containing the toner is detachably attached to the toner supply device 90 disposed inside the apparatus body of the image forming apparatus 100.

As illustrated in FIGS. 4, 5A, 5B, and 5C, the toner container 32Y includes the container body 33 and a shutter unit. The shutter unit includes a holder 34, a shutter 35, a rod 36, and a compression spring 38. The holder 34 includes a stand 34*a* serving as a cap. The container body 33 is secured to the stand 34*a* of the holder 34. The container body 33 is a bottle having the inner circumferential face (e.g., an inner circumference) provided with the groove 33*a* that is spiral as illustrated in FIG. 3.

In a state in which the toner container 32Y is attached to the mount 31 disposed inside the apparatus body of the image forming apparatus 10, the driving motor 111 of the driver 110 disposed inside the apparatus body of the image forming apparatus 100 drives and rotates the holder 34 including the stand 34*a*, the shutter 35, the rod 36, the compression spring 38, and the container body 33. Thus, the toner contained in the toner container 32Y is discharged to the developing device 5Y through the first horizontal conveyance path 91.

As illustrated in FIGS. 4, 5A, 5B, and 5C, the shutter 35 is interlocked with the toner container 32Y. In accordance with installation and removal of the toner container 32Y with respect to the image forming apparatus 100, the shutter 35 blocks and exposes the through-hole 34*a*1 in which the first horizontal conveyance path 91 of the toner supply device 90 is inserted. The shutter 35 is made of a resin material and combined or molded with the rod 36 described below. The shutter 35 fits and engages the through-hole 34*a*1 from an interior of the container body 33 so that the shutter 35 does not fall off the container body 33 into the outside of the container body 33. In a state in which the shutter 35 blocks the through-hole 34*a*1, the shutter 35 prevents the toner contained in the toner container 32Y from being discharged into the outside of the toner container 32Y. In a state in which the shutter 35 exposes the through-hole 34*a*1, the shutter 35 allows the toner contained in the toner container 32Y to be discharged into the outside of the toner container 32Y.

The through-hole 34*a*1 is a hole that is substantially tubular about a center of rotation of the container body 33. The shutter 35 is a plug that fits the through-hole 34*a*1 that is substantially tubular as described above.

The toner container 32Y further includes a seal 40 that seals a gap between the shutter 35 and the through-hole 34*a*1 in a state in which the shutter 35 blocks the through-hole 34*a*1.

The rod 36 is combined with the shutter 35. The rod 36 extends inside the container body 33 in an exposing-blocking direction of the shutter 35 (e.g., a horizontal direction in FIGS. 4, 5A, 5B, and 5C).

Figure 4:
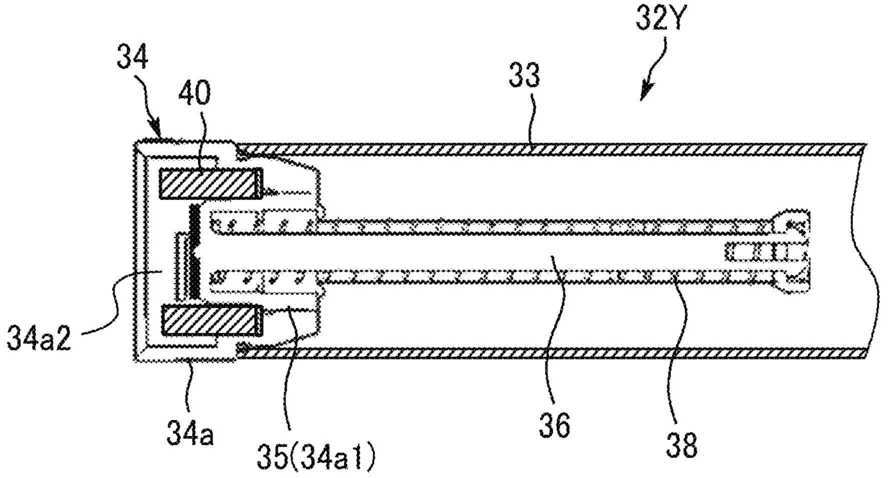
FIG. 4 is a cross-sectional view of a toner container incorporated in the image forming apparatus depicted in FIG. 1, illustrating a main section of the toner container.

As illustrated in FIG. 4, the rod 36 has an axis that overlaps the center of rotation of the container body 33 substantially. Accordingly, when the container body 33 is driven and rotated, the rod 36 prevents the shutter 35 from shifting from a proper position.

As illustrated in FIGS. 4, 5A, 5B, and 5C, the holder 34 includes the stand 34*a* (e.g., the cap) and an extension 34*b*. The holder 34 is secured to the container body 33. As the holder 34 receives a driving force from the driver 110 disposed inside the apparatus body of the image forming apparatus 100, the holder 34, together with the container body 33, rotates around the first horizontal conveyance path 91.

The stand 34*a* (e.g., the cap) of the holder 34 includes the through-hole 34*a*1. The stand 34*a* is parallel to an insertion direction in which the first horizontal conveyance path 91 is inserted into the holder 34 and the horizontal direction in FIGS. 4, 5A, 5B, and 5C.

The stand 34*a* includes a slot 34*a*2 (e.g., a cavity) that is disposed at a front of the stand 34*a*, that is, an upstream portion of the stand 34*a*, that is disposed upstream from the through-hole 34*a*1 in the insertion direction of the first horizontal conveyance path 91. The upstream portion is a left portion of the stand 34*a* in the horizontal direction in FIGS. 4, 5A, 5B, and 5C. The slot 34*a*2 is disposed opposite the first horizontal conveyance path 91. The slot 34*a*2 is a recess that is substantially tubular about the center of rotation of the container body 33.

The extension 34*b* of the holder 34 is disposed inside the container body 33 of the toner container 32Y. The extension 34*b* holds the rod 36 at one lateral end (e.g., a right end in FIGS. 4, 5A, 5B, and 5C) of the rod 36, that is opposite to another lateral end of the rod 36, that is disposed in proximity to the shutter 35, in the exposing-blocking direction of the shutter 35 such that the rod 36 is movable in the exposing-blocking direction of the shutter 35. The extension 34*b* is substantially U-shaped. The extension 34*b* extends inside the container body 33 of the toner container 32Y in the horizontal direction in FIGS. 4, 5A. 5B, and 5C.

The compression spring 38 serving as a biasing member is interposed between the shutter 35 and a wall of the extension 34*b* and is wound around the rod 36. The compression spring 38 biases the shutter 35 leftward in FIGS. 4, 5A, 5B, and 5C in a blocking direction in which the shutter 35 blocks the through-hole 34*a*1.

As the toner container 32Y is attached to the mount 31 inside the apparatus body of the image forming apparatus 100, the shutter 35 configured as described above is pressed by the first horizontal conveyance path 91 and moved against a biasing force from the compression spring 38 serving as the biasing member into the container body 33 of the toner container 32Y together with the rod 36. Thus, the shutter 35 exposes the through-hole 34*a*1. For example, when the shutter 35 exposes the through-hole 34*a*1, the shutter 35 and the rod 36 move from a position illustrated in FIG. 5A to a position illustrated in FIG. 5C.

Conversely, as the toner container 32Y is detached from the mount 31 inside the apparatus body of the image forming apparatus 100, the shutter 35 is free from pressure from the first horizontal conveyance path 91 and moved by the biasing force from the compression spring 38 toward the through-hole 34*a*1 together with the rod 36. Thus, the shutter 35 blocks the through-hole 34*a*1. For example, when the shutter 35 blocks the through-hole 34*a*1, the shutter 35 and the rod 36 move from the position illustrated in FIG. 5C to the position illustrated in FIG. 5A.

Figure 5A:
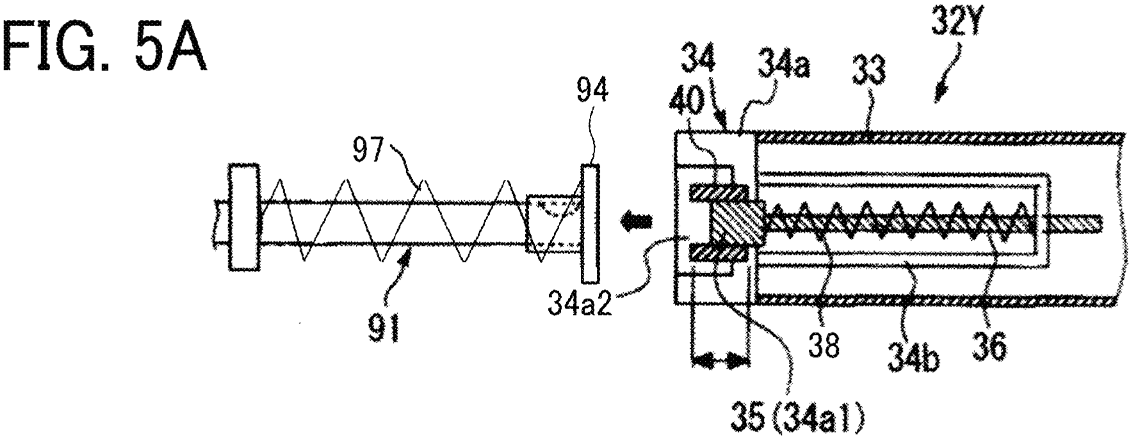
FIG. 5A is a schematic diagram of the toner container depicted in FIG. 4 and a first conveyance path incorporated in the toner supply device depicted in FIG. 3 in a state in which the first conveyance path is not inserted into the toner container.
Figure 5B:
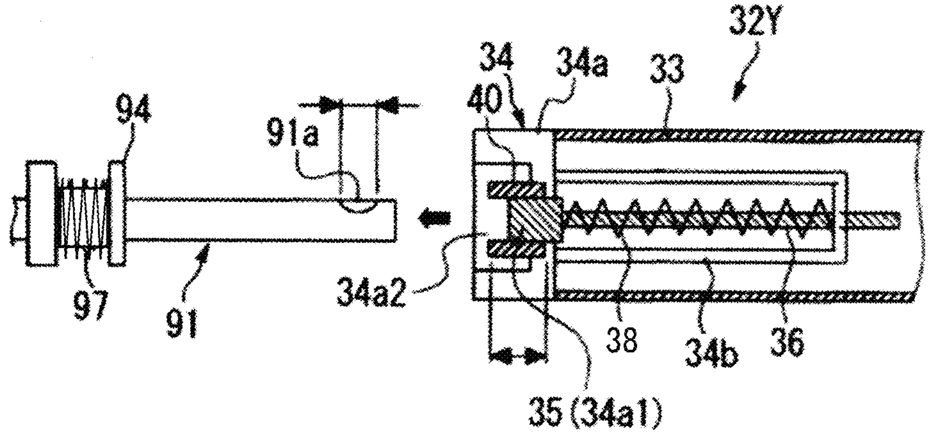
FIG. 5B is a schematic diagram of the toner container and the first conveyance path depicted in FIG. 5A in a state in which the first conveyance path is not inserted into the toner container.
Figure 5C:
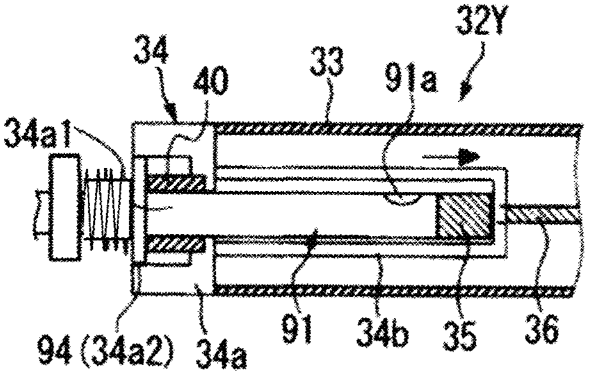
FIG. 5C is a schematic diagram of the toner container and the first conveyance path depicted in FIG. 5A in a state in which the first conveyance path is inserted into the toner container.

As illustrated in FIG. 5C, when installation of the toner container 32Y into the image forming apparatus 100 is finished, the shutter 35 contacts the wall of the extension 34*b* and the recess of the shutter 35 accommodates the compression spring 38. Accordingly, in a state in which the toner container 32Y is installed in the image forming apparatus 10X), the shutter 35 prevents the compression spring 38 from being adhered with the toner inside the container body 33.

As illustrated in FIGS. 5A, 5B, and 5C, according to the embodiment, the first horizontal conveyance path 91 mounts a fitting portion 94 that fits the slot 34*a*2 as the first horizontal conveyance path 91 is inserted into the through-hole 34*a*1.

For example, the fitting portion 94 has an outer diameter that is greater than an outer diameter of a main portion of the first horizontal conveyance path 91. The fitting portion 94 is substantially tubular and fits the slot 34*a*2 of the stand 34*a*. The fitting portion 94 moves and slides over the main portion of the first horizontal conveyance path 91 in the insertion direction thereof. The first horizontal conveyance path 91 mounts a compression spring 97 that biases the fitting portion 94 rightward in FIGS. 5A, 5B, and 5C and downstream in the insertion direction of the first horizontal conveyance path 91. The fitting portion 94 also serves as a cover that covers a first inlet 91*a* of the first horizontal conveyance path 91. In a state in which the toner container 32Y is not installed in the image forming apparatus 100, as illustrated in FIG. 5A, the fitting portion 94 covers the first inlet 91*a*. As the toner container 32Y is installed in the image forming apparatus 100, as illustrated in FIG. 5C, the fitting portion 94 moves and slides over the first horizontal conveyance path 91. Thus, the main portion of the first horizontal conveyance path 91 is inserted into the container body 33. FIG. 5B illustrates a state in which the first inlet 91*a* is exposed after the fitting portion 94 moves and slides over the first horizontal conveyance path 91.

As the toner container 32Y is installed into the image forming apparatus 100 and therefore the first horizontal conveyance path 91 is inserted into the container body 33 of the toner container 32Y, the fitting portion 94 configured as described above is fitted to the slot 34*a*2 by a biasing force from the compression spring 97. Conversely, as the toner container 32Y is removed from the image forming apparatus 100 and therefore the first horizontal conveyance path 91 is pulled out of the container body 33 of the toner container 32Y, the fitting portion 94 is pulled out of the slot 34*a*2.

A description is provided of a construction of a comparative powder conveyance device.

The comparative powder conveyance device includes a first conveyance path that extends horizontally and a second conveyance path (e.g., a fall path) that extends vertically and communicates with the first conveyance path. The first conveyance path accommodates a conveying screw serving as a conveyor that conveys toner. The second conveyance path accommodates a swing member (e.g., a swing rod) that swings vertically as the conveying screw rotates. Thus, the swing member prevents aggregation of the toner. The swing member has one end that mounts a hook. The hook hangs on a shaft of the conveying screw.

While the comparative powder conveyance device is assembled, for example, one end of the swing member, that is attached to the conveying screw serving as the conveyor, may separate from the conveying screw. If the swing member separates from the conveying screw, the swing member may not decrease aggregation of the toner in the second conveyance path.

Referring to FIGS. 6, 7, 8, 9A, 9B, 10A, and 10B, a detailed description is provided of a construction and operations of the toner supply device 90 serving as the powder conveyance device according to an embodiment of the present disclosure.

Figure 6:
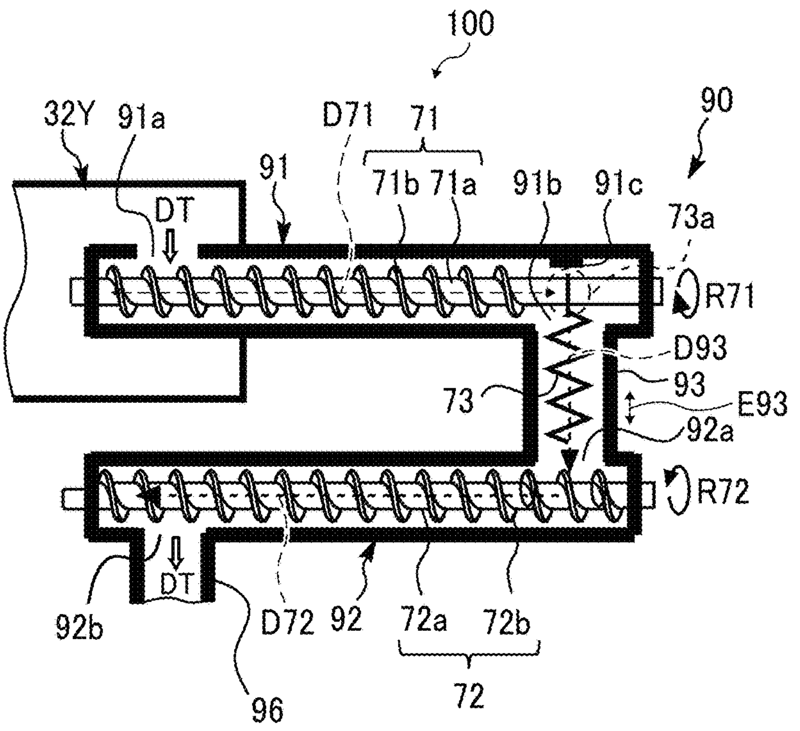
FIG. 6 is a schematic diagram of the toner supply device serving as the powder conveyance device depicted in FIG. 3.

In order to clarify, the construction and the operations of the toner supply device 90. FIG. 6 modifies an arrangement direction in which the second horizontal conveyance path 92 is arranged with the first horizontal conveyance path 91. Practically, as illustrated in FIG. 7, the second horizontal conveyance path 92 is substantially perpendicular to the first horizontal conveyance path 91.

Figure 7:
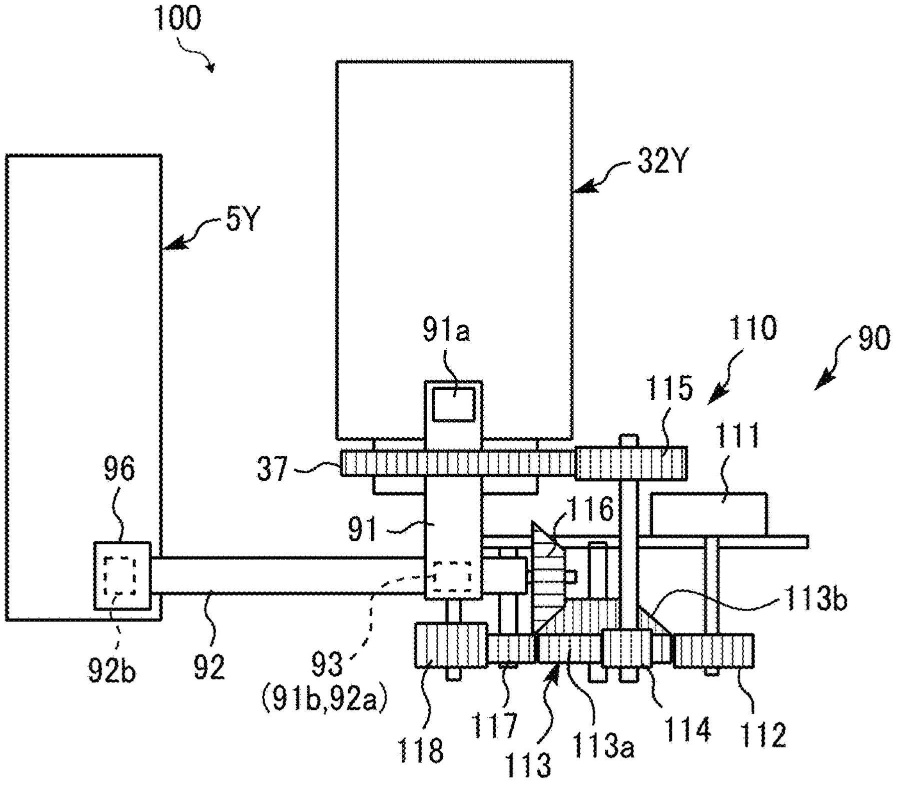
FIG. 7 is a diagram of the toner supply device depicted in FIG. 6, illustrating a driver that drives the toner supply device.

As illustrated in FIGS. 6 and 7, the toner supply device 90 serving as the powder conveyance device includes the first horizontal conveyance path 91 serving as the first conveyance path, the fall path 93 (e.g., the first fall path) serving as the second conveyance path, the second horizontal conveyance path 92, and the conveyance tube 96 (e.g., a second fall path). Thus, the toner as the powder discharged from the toner container 32Y as a supplier is conveyed to the developing device 5Y as the supply destination through conveyance paths, that is, the first horizontal conveyance path 91, the second horizontal conveyance path 92, the fall path 93, and the conveyance tube 96.

The first horizontal conveyance path 91 serving as the first conveyance path accommodates a first conveying screw 71 serving as a conveyor or a first conveyor that rotates in a predetermined rotation direction R71 and conveys the toner as the powder substantially horizontally.

The first conveying screw 71 serving as the conveyor includes a shaft 71*a* and a screw portion 71*b* that is wound around the shaft 71*a* spirally. The first conveying screw 71 is made of a metal material or a resin material.

The first horizontal conveyance path 91 serving as the first conveyance path is a conveyance tube having a circular cross section. The first horizontal conveyance path 91 is made of a metal material or a resin material. The first horizontal conveyance path 91 includes the first inlet 91*a* and a first outlet 91*b*. The first inlet 91*a* is disposed upstream from the first outlet 91*b* in a toner conveyance direction DT. The first inlet 91*a* communicates with the toner container 32Y. The first outlet 91*b* (e.g., an outlet) is disposed downstream from the first inlet 91*a* in the toner conveyance direction DT. The first outlet 91*b* communicates with the fall path 93.

The first horizontal conveyance path 91 serving as the first conveyance path further includes a projection 91*c* serving as a restrictor. The projection 91*c* is disposed on a ceiling of a downstream portion of the first horizontal conveyance path 91 in the toner conveyance direction DT. A detailed description of a configuration of the projection 91*c* is provided below.

The fall path 93 serving as the second conveyance path extends in an angled direction that is angled with respect to the first horizontal conveyance path 91. According to the embodiment, the angled direction is an orthogonal direction that intersects the first horizontal conveyance path 91 serving as the first conveyance path. The fall path 93 communicates with the first horizontal conveyance path 91. The toner passes through the fall path 93 most smoothly when the angled direction is the orthogonal direction due to gravity. Alternatively, the toner may pass through the fall path 93 that is angled with respect to the orthogonal direction at an angle that is smaller than 45 degrees.

For example, the fall path 93 serving as the second conveyance path is a tube through which the toner discharged through an outlet (e.g., the first outlet 91*b*) of the first horizontal conveyance path 91 falls freely. The fall path 93 extends substantially vertically. The fall path 93 may be a conveyance tube having a circular cross section or a polygonal cross section.

The fall path 93 serving as the second conveyance path accommodates a swing member 73 that prevents aggregation of the toner in the fall path 93. A detailed description of a configuration of the swing member 73 is provided below.

The second horizontal conveyance path 92 includes a second inlet 92*a* (e.g., an inlet) and accommodates a second conveying screw 72 serving as a second conveyor. The toner falling through the fall path 93 enters the second horizontal conveyance path 92 through the second inlet 92*a*. The second conveying screw 72 conveys the toner substantially horizontally.

The second conveying screw 72 includes a shaft 72*a* and a screw 72*b* that is wound around the shaft 72*a* spirally. The second conveying screw 72 is made of a rubber material such as elastomer, a metal material, or a resin material.

The second horizontal conveyance path 92 is a conveyance tube having a circular cross section. The second horizontal conveyance path 92 is made of a metal material or a resin material. The second horizontal conveyance path 92 includes the second inlet 92*a* and a second outlet 92*b*. The second inlet 92*a* is disposed upstream from the second outlet 92*b* in the toner conveyance direction DT. The second inlet 92*a* communicates with the fall path 93. The second outlet 92*b* is disposed downstream from the second inlet 92*a* in the toner conveyance direction DT. The second outlet 92*b* communicates with the conveyance tube 96 serving as the second fall path of the toner supply device 90.

The conveyance tube 96 serving as the second fall path is a path through which the toner discharged through the second outlet 92*b* of the second horizontal conveyance path 92 falls freely. The conveyance tube 96 extends substantially vertically. The toner falling freely through the conveyance tube 96 is supplied to the developing device 5Y.

According to the embodiment, the toner is conveyed from the second horizontal conveyance path 92 to the developing device 5Y through the conveyance tube %. Alternatively, the toner may be conveyed from the second horizontal conveyance path 92 to the developing device 5Y directly.

In the toner supply device 90 serving as the powder conveyance device that has the construction described above, as illustrated in FIG. 6, the toner flows into the first horizontal conveyance path 91 from the toner container 32Y in the toner conveyance direction DT. The first conveying screw 71 rotates in the predetermined rotation direction R71 and conveys the toner rightward in FIG. 6, that is, substantially horizontally in a toner conveyance direction D71. Thereafter, the toner falls freely through the fall path 93 downward in FIG. 6 in a falling direction D93. Thereafter, the toner flows into the second horizontal conveyance path 92 from the fall path 93. The second conveying screw 72 rotates in a predetermined rotation direction R72 and conveys the toner leftward in FIG. 6, that is, substantially horizontally in a toner conveyance direction D72. Thereafter, the toner flows into the conveyance tube 96 from the second horizontal conveyance path 92. After the toner falls freely through the conveyance tube 96, the toner flows into the developing device 5Y.

As described above, the toner supply device 90 includes a plurality of conveyance paths, that is, the first horizontal conveyance path 91, the second horizontal conveyance path 92, the fall path 93, and the conveyance tube 96. Hence, even if the toner container 32Y serving as the supplier is separated from the developing device 5Y serving as the supply destination or even if the toner container 32Y and the developing device 5Y are oriented in different directions, respectively, the toner container 32Y supplies the toner to the developing device 5Y. In other words, the toner supply device 90 improves flexibility in layout of the toner container 32Y and the developing device 5Y.

For example, as illustrated in FIG. 7, according to the embodiment, a toner conveyance direction in which the toner as the powder is conveyed through the first horizontal conveyance path 91 intersects or is substantially perpendicular to a toner conveyance direction in which the toner is conveyed through the second horizontal conveyance path 92. According to the embodiment, the toner conveyance direction D71 of the first conveying screw 71 inside the first horizontal conveyance path 91 is substantially perpendicular to the toner conveyance direction D72 of the second conveying screw 72 inside the second horizontal conveyance path 92. Hence, the toner supply device 90 further improves flexibility in layout of the toner container 32Y and the developing device 5Y.

As illustrated in FIG. 7, the toner supply device 90 serving as the powder conveyance device according to the embodiment is coupled with the driver 110 that drives the first conveying screw 71 serving as the conveyor and the second conveying screw 72.

For example, according to the embodiment, a driver that drives the first conveying screw 71 is not separated from a driver that drives the second conveying screw 72. The driver 110, that is, a shared driver, drives the first conveying screw 71 and the second conveying screw 72. Additionally, according to the embodiment, the driver 110 that drives the first conveying screw 71 and the second conveying screw 72 also drives the container body 33 of the toner container 32Y.

Hence, compared to a configuration in which a plurality of drivers drives the first conveying screw 71, the second conveying screw 72, and the toner container 32Y, respectively, the toner supply device 90 achieves reduced costs and downsizing.

For example, as illustrated in FIG. 7, the driver 110 includes the driving motor 111 and a gear train constructed of a plurality of gears, that is, a driving gear 112, a double gear 113, idler gears 114 and 115, a bevel gear 116, an idler gear 117, and a driven gear 118.

The driving motor 111 generates a driving force that is transmitted from the driving gear 112 mounted on a motor shaft through the idler gears 114 and 115 to the gear 37 of the toner container 32Y, thus driving and rotating the container body 33 of the toner container 32Y.

The driving force generated by the driving motor 111 is transmitted from the driving gear 112 mounted on the motor shaft through a spur gear 113*a* of the double gear 113 and the idler gear 117 to the driven gear 118 coupled with the first conveying screw 71 disposed inside the first horizontal conveyance path 91, thus driving and rotating the first conveying screw 71.

The driving force generated by the driving motor 111 is transmitted from the driving gear 112 mounted on the motor shaft through the double gear 113, that is constructed of the spur gear 113*a* and a bevel gear 113*b* arranged stepwise, to the bevel gear 116 coupled with the second conveying screw 72 disposed inside the second horizontal conveyance path 92, thus driving and rotating the second conveying screw 72.

In the driver 110 constructed as described above, as a controller disposed inside the apparatus body of the image forming apparatus 100 controls the driving motor 111 to generate a driving force, the driving force drives and rotates the container body 33 of the toner container 32Y, the first conveying screw 71, and the second conveying screw 72.

The density sensor 56 depicted in FIG. 2 detects the rate (e.g., the toner density) of the toner of the developer G inside the developing device 5Y. The controller controls and drives the driving motor 111 properly so that the toner density detected by the density sensor 56 is in the predetermined range. For example, whenever the toner density detected by the density sensor 56 is below a predetermined value, the controller drives the driving motor 111 for a predetermined time.

As illustrated in FIGS. 6, 8, 9A, 9B, 10A, and 10B, the toner supply device 90 serving as the powder conveyance device according to the embodiment includes the swing member 73 that swings in accordance with rotation of the first conveying screw 71 serving as the conveyor. The swing member 73 is disposed inside the fall path 93 serving as the second conveyance path.

Figure 9A:
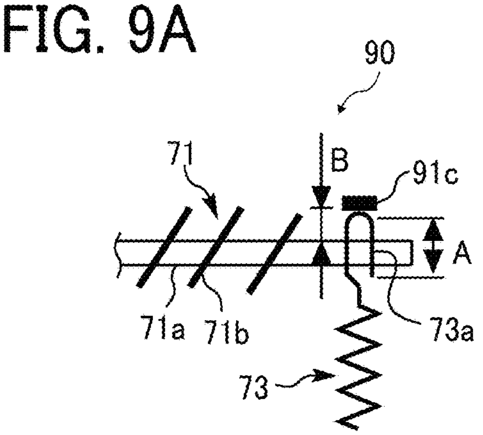
FIG. 9A is a schematic diagram of the toner supply device depicted in FIG. 8 that incorporates a hook, a first conveying screw, and a projection, illustrating a relation between an engagement margin of the hook that engages a shaft of the first conveying screw and a clearance between the projection and the shaft of the first conveying screw.
Figure 9B:
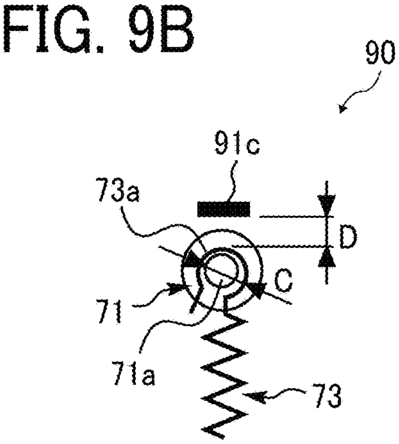
FIG. 9B is a schematic diagram of the toner supply device depicted in FIG. 9A, illustrating a relation between an inner diameter of the hook and a distance between the hook and the projection.
Figure 10A:
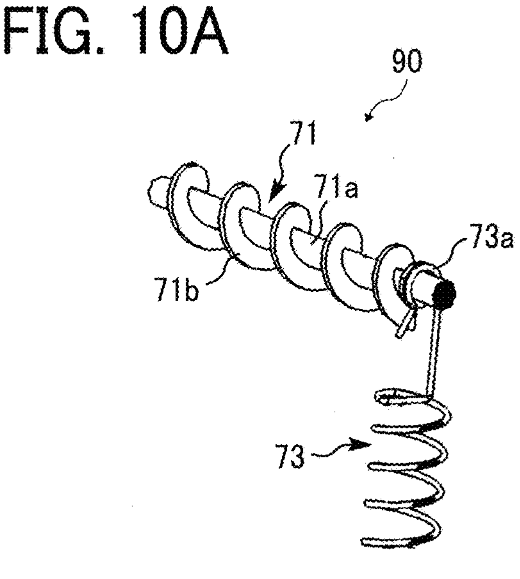
FIG. 10A is a perspective view of the hook depicted in FIG. 9A that engages the shaft of the first conveying screw properly.
Figure 10B:
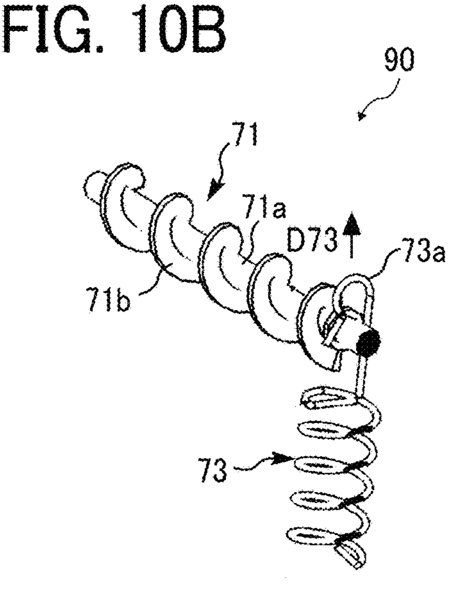
FIG. 10B is a perspective view of the hook depicted in FIG. 9A that disengages the shaft of the first conveying screw.

The swing member 73 has one end (e.g., an upper portion in FIG. 6) that is detachably attached to the first conveying screw 71 serving as the conveyor such that the swing member 73 is detached in a predetermined direction, that is, an upward direction in FIGS. 6, 9A, and 9B and a detaching direction D73 in FIG. 10B.

For example, the swing member 73 is a coil made of a metal material or a resin material. The swing member 73 includes a hook 73*a* that is disposed at one end of the swing member 73. The hook 73*a* hangs on the shaft 71*a* of the first conveying screw 71 serving as the conveyor.

The hook 73*a* is a hanger disposed at one end of the swing member 73, that is, the coil made of wire. The hook 73*a* has an inner diameter that is slightly greater than an outer diameter of the shaft 71*a* of the first conveying screw 71. As the swing member 73 moves with respect to the shaft 71*a* in an opposite direction that is opposite to the detaching direction D73 depicted in FIG. 10B, the hook 73*a* fits or engages the shaft 71*a*. Thus, the hook 73*a* is attached to the shaft 71*a* as illustrated in FIG. 10A.

Figure 8:
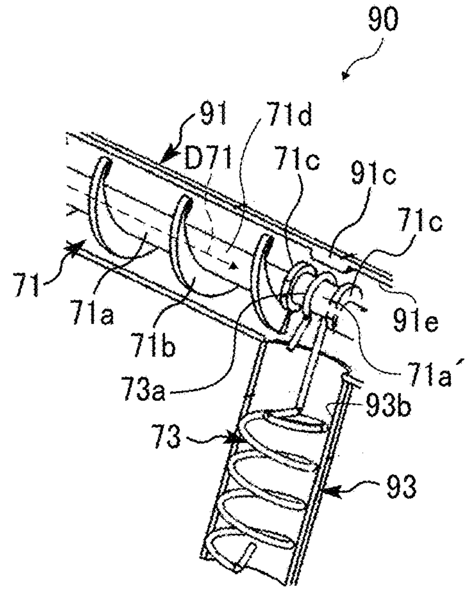
FIG. 8 is a perspective view of the toner supply device depicted in FIG. 6, illustrating an interior of a main section of the toner supply device.

The first conveying screw 71 and the swing member 73 that are assembled as illustrated in FIG. 10A are installed into the first horizontal conveyance path 91 and the fall path 93, respectively, that are dividable as illustrated in FIG. 8. FIG. 8 illustrates one divided half of each of the first horizontal conveyance path 91 and the fall path 93. Thereafter, another divided half of each of the first horizontal conveyance path 91 and the fall path 93 is coupled with the one divided half thereof. Thus, the first horizontal conveyance path 91 accommodating the first conveying screw 71 and the fall path 93 accommodating the swing member 73 are prepared.

The hook 73*a* is an arc having an arc length defined by an angle in a range of from approximately 200 degrees to approximately 300 degrees. The hook 73*a* hangs on an eccentric portion 71*a* of the shaft 71*a* readily and does not disengage the eccentric portion 71*a* easily.

The inner diameter of the hook 73*a* is adjusted such that the hook 73*a* engages the eccentric portion 71*a*' of the shaft 71*a* somewhat loosely. Thus, even if the eccentric portion 71*a*' of the shaft 71*a* rotates, the hook 73*a* does not rotate with the eccentric portion 71*a* easily.

In the toner supply device 90 assembled as described above, the swing member 73 swings vertically in FIGS. 6, 9A, and 9B in a longitudinal direction of the fall path 93 serving as the second conveyance path, that is, an extending direction E93 in which the fall path 93 extends.

For example, as illustrated in FIG. 8, the screw portion 71*b* of the first conveying screw 71 is not mounted on a downstream end of the shaft 71*a* in the toner conveyance direction D71, that is, a right lateral end of the shaft 71*a* depicted in FIG. 6. The first conveying screw 71 includes two increased diameter portions 71*c*. The eccentric portion 71*a*' is interposed between the two increased diameter portions 71*c* in the toner conveyance direction D71.

The two increased diameter portions 71*c* are spaced apart from each other in an axial direction of the first conveying screw 71. Each of the increased diameter portions 71*c* has an outer diameter that is greater than the outer diameter of the shaft 71*a* and an outer diameter of the eccentric portion 71*a*' and is smaller than an outer diameter of the screw portion 71*b*. The two increased diameter portions 71*c* restrict motion of the hook 73*a* hanging on the eccentric portion 71*a* of the shaft 71*a* in the axial direction of the first conveying screw 71. When seen from above in a projection view, the two increased diameter portions 71*c* are situated within a diametrical span of the fall path 93.

The eccentric portion 71*a* (e.g., an eccentric shaft) has a shaft center (e.g., a central axis) that is eccentric with respect to a shaft center of the shaft 71*a* (e.g., a shaft center of a shaft portion 71*d* of the shaft 71*a*). When seen in the axial direction of the first conveying screw 71 in a projection view, the eccentric portion 71*a*' is situated within an outer diametrical span of the screw portion 71*b*. According to the embodiment, the eccentric portion 71*a*' has a diameter that is equivalent to a diameter of the shaft portion 71*d* of the shaft 71*a*. Alternatively, the eccentric portion 71*a*' may have a diameter that is smaller than the diameter of the shaft portion 71*d* of the shaft 71*a* as long as the diameter of the eccentric portion 71*a*' is smaller than a diameter of the increased diameter portion 71*c*.

With the above-described construction of the toner supply device 90, as the first conveying screw 71 rotates, the swing member 73 swings vertically inside the fall path 93, decreasing failures such as aggregation of the toner inside the fall path 93 and adhesion of the toner to an inner wall 93*b* of the fall path 93.

FIGS. 6, 9A, and 9B omit illustration of the eccentric portion 71*a*' and the increased diameter portions 71*c* for simplification.

As illustrated in FIGS. 6, 8, 9A, and 9B, the first horizontal conveyance path 91 serving as the first conveyance path mounts the projection 91*c* serving as the restrictor that restricts motion of the swing member 73 in the predetermined direction, that is, the detaching direction D73 depicted in FIG. 10B.

For example, the projection 91*c* serving as the restrictor is disposed opposite the hook 73*a* The projection 91*c* projects from an inner wall 91*e* of the first horizontal conveyance path 91 serving as the first conveyance path toward the hook 73*a*, that is, downward in FIGS. 6, 8, 9A, and 9B. According to the embodiment, the projection 91*c* that is substantially rectangular is combined with a part of an inner wall of a case that constructs the first horizontal conveyance path 91.

The projection 91*c* serving as the restrictor is positioned with respect to the swing member 73 such that the projection 91*c* does not contact the swing member 73 even if the swing member 73 swings and that the projection 91*c* does not contact the first conveying screw 71 serving as the conveyor even if the first conveying screw 71 rotates.

For example, while the swing member 73 swings vertically in a state in which the swing member 73 hangs on the first conveying screw 71 properly and does not disengage the first conveying screw 71, the hook 73*a* of the swing member 73 does not come into contact with the projection 91*c*. The first conveying screw 71 that rotates does not come into contact with the projection 91*c*.

For example, the projection 91*c* is interposed between the two increased diameter portions 71*c* and disposed within a span in the axial direction of the first conveying screw 71 in which the eccentric portion 71*a*' is disposed. Even if the hook 73*a* moves to an uppermost part of a swing span of the swing member 73, the hook 73*a* does not come into contact with the projection 91*c*. According to the embodiment, when seen in the axial direction of the first conveying screw 71 in a projection view, the projection 91*c* is situated outside the outer diametrical span of the screw portion 71*b*.

Accordingly, the projection 91*c* does not damage the first conveying screw 71, the swing member 73, and the like. Consequently, the first conveying screw 71 conveys the toner properly and the swing member 73 decreases aggregation of the toner in the fall path 93 properly.

As described above, according to the embodiment, the projection 91*c* serving as the restrictor restricts motion of the swing member 73 in the detaching direction D73 depicted in FIG. 10B, that is, a disengaging direction in which the hook 73*a* of the swing member 73 disengages the shaft 71*a* of the first conveying screw 71. In addition to a time when the toner supply device 90 is driven, even at a time when the toner supply device 90 is assembled, for example, the swing member 73 having one end attached to the first conveying screw 71 does not disengage the first conveying screw 71 easily. Hence, the swing member 73 decreases aggregation of the toner in the fall path 93 stably.

The toner supply device 90 according to the embodiment employs the projection 91*c* that is substantially rectangular as the restrictor that restricts motion of the swing member 73 in the detaching direction D73, that is, the disengaging direction. However, the restrictor is not limited to the swing member 73 as long as the restrictor restricts motion of the swing member 73 in the detaching direction D73 depicted in FIG. 10B.

As illustrated in FIG. 9A, according to the embodiment, the hook 73*a* engages the eccentric portion 71*a* of the shaft 71*a* of the first conveying screw 71 serving as the conveyor for an engagement margin A (e.g., an engagement length). The projection 91*c* is disposed opposite the eccentric portion 71*a*' of the shaft 71*a* with a clearance B therebetween. The engagement margin A is greater than the clearance B. That is, the engagement margin A and the clearance B define a relation of A>B.

Accordingly, the hook 73*a* of the swing member 73 is more immune from a failure that the hook 73*a* disengages the shaft 71*a* of the first conveying screw 71.

In the present disclosure, the engagement margin A of the hook 73*a* defines a moving distance for which the hook 73*a* hanging on the shaft 71*a* properly moves to disengage the shaft 71*a*, if the projection 91*c* is not mounted on the inner wall 91*e* of the first horizontal conveyance path 91. The engagement margin A defines a margin or a clearance for disengagement of the hook 73*a* from the shaft 71*a*.

As illustrated in FIG. 9B, according to the embodiment, the hook 73*a* has an inner diameter C. The hook 73*a* and the projection 91*c* define a distance D therebetween. The inner diameter C and the distance D define a relation of C/2>D.

For example, the hook 73*a* has a radius defined by C/2. The radius of the hook 73*a* is greater than the distance D between an outer circumference of the hook 73*a* and an opposed face of the projection 91*c*, that is disposed opposite the hook 73*a*.

Accordingly, even if the hook 73*a* of the swing member 73 is about to disengage the shaft 71*a* of the first conveying screw 71, resilience of the hook 73*a* returns the swing member 73 to a proper engaging position where the hook 73*a* engages or hangs on the shaft 71*a* of the first conveying screw 71 readily.

A description is provided of a construction of a toner supply device 90A according to a first modification embodiment of the toner supply device 90.

Figure 11:
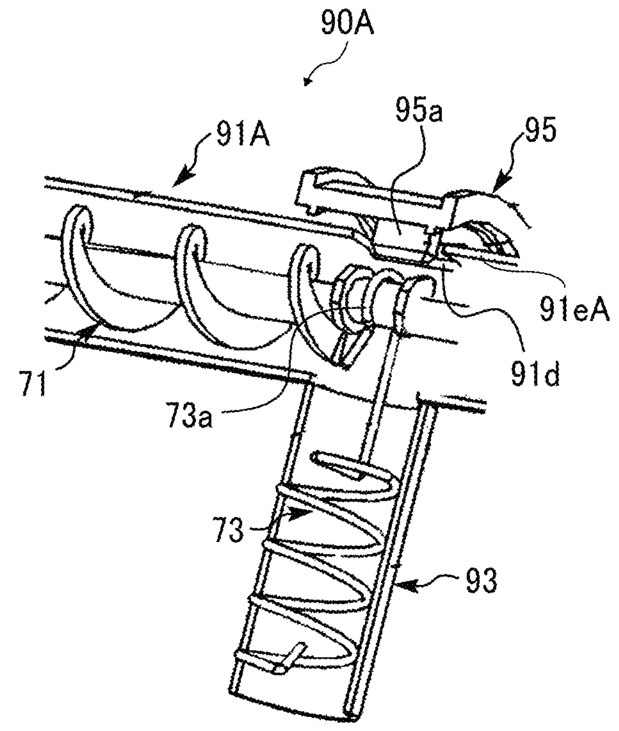
FIG. 11 is a perspective view of a toner supply device according to a first modification embodiment of the toner supply device depicted in FIG. 8, illustrating an interior of a main section of the toner supply device.

As illustrated in FIG. 11, the toner supply device 90A according to the first modification embodiment includes a projection 95*a* serving as a restrictor. The projection 95*a* is detachably attached to a first horizontal conveyance path 91A serving as a first conveyance path.

For example, the first horizontal conveyance path 91A includes a through-hole 91*d* that is substantially rectangular. The through-hole 91*d* is disposed in a ceiling of the first horizontal conveyance path 91A and is disposed opposite the hook 73*a* of the swing member 73. The toner supply device 90A further includes a cover 95 that covers the through-hole 91*d* of the first horizontal conveyance path 91A. The cover 95 is detachably attached to the first horizontal conveyance path 91A. The cover 95 has an opposed face that is disposed opposite an outer circumferential face of the first horizontal conveyance path 91A. The opposed face of the cover 95 mounts the projection 95*a* serving as the restrictor. As the cover 95 is attached to the first horizontal conveyance path 91A, the projection 95*a* is inserted into the first horizontal conveyance path 91A through the through-hole 91*d*. Thus, the projection 95*a* protrudes downward beyond an inner wall 91*e*A (e.g., the ceiling) of the first horizontal conveyance path 91A, thus serving as the restrictor that prevents disengagement of the hook 73*a* from the first conveying screw 71.

With the above-described construction of the toner supply device 90A also, the swing member 73 having one end attached to the first conveying screw 71 does not disengage the first conveying screw 71 easily. According to the first modification embodiment, the first horizontal conveyance path 91A has the through-hole 91*d*. Hence, the user visually checks an engaging condition of the hook 73*a* of the swing member 73 through the through-hole 91*d*.

According to the first modification embodiment, the projection 95*a* serving as the restrictor is combined with the cover 95 provided as a separate part separated from the first horizontal conveyance path 91A. Alternatively, the projection 95*a* may be detachably attached to the cover 95.

A description is provided of a construction of a toner supply device 90B according to a second modification embodiment of the toner supply device 90.

Figure 12:
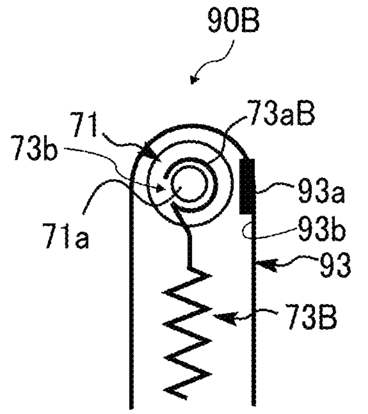
FIG. 12 is a perspective view of a toner supply device according to a second modification embodiment of the toner supply device depicted in FIG. 8, illustrating a main section of the toner supply device seen in an axial direction of the first conveying screw.

As illustrated in FIG. 12, the toner supply device 90B according to the second modification embodiment includes a swing member 73B having one end that hangs on the first conveying screw 71. The swing member 73B separates from the first conveying screw 71 rightward in FIG. 12, not vertically.

For example, the swing member 73B includes a hook 73*a*B having a mouth 73*b*. The mouth 73*b* faces left in FIG. 12. The toner supply device 90B further includes a projection 93*a* serving as a restrictor that restricts motion of the swing member 73B in a rightward direction in FIG. 12, that is, a predetermined direction or a detaching direction of the hook 73*a*B. The projection 93*a* is mounted on the inner wall 93*b* of the fall path 93 serving as the second conveyance path, not the first horizontal conveyance path 91 serving as the first conveyance path.

With the above-described construction of the toner supply device 90B also, the swing member 73B having one end attached to the first conveying screw 71 does not separate from the first conveying screw 71 easily.

Alternatively, according to the second modification embodiment, the projection 93*a* serving as the restrictor may be detachably attached to the fall path 93 serving as the second conveyance path.

As described above, according to the embodiments, the toner supply device 90, 90A, or 90B serving as the powder conveyance device includes the first horizontal conveyance path 91 or 91A serving as the first conveyance path or the first conveyance tube and the fall path 93 serving as the second conveyance path or the second conveyance tube. The first horizontal conveyance path 91 or 91A accommodates the first conveying screw 71 serving as the conveyor that rotates in the predetermined direction and conveys the toner as the powder. The fall path 93 extends in the orthogonal direction that intersects the first horizontal conveyance path 91 or 91A. The fall path 93 communicates with the first horizontal conveyance path 91 or 91A. The fall path 93 accommodates the swing member 73 or 73B that swings in accordance with rotation of the first conveying screw 71. The swing member 73 or 73B has one end that is detachably attached to the first conveying screw 71. The swing member 73 or 73B is detached from the first conveying screw 71 in the predetermined direction. The projections 91*c* and 95*a* are disposed inside the first horizontal conveyance paths 91 and 91A, respectively. The projection 93*a* is disposed inside the fall path 93. Each of the projections 91*c*. 95*a*, and 93*a* serves as the restrictor that restricts motion of the swing member 73 or 73B in the predetermined direction.

Accordingly, the swing member 73 or 73B having one end attached to the first conveying screw 71 does not disengage the first conveying screw 71 easily.

According to the embodiments, the technology of the present disclosure is applied to the toner supply device 90, 90A, or 90B serving as the powder conveyance device that conveys the toner as the powder. However, the powder conveyance device applied with the technology of the present disclosure is not limited to the toner supply device 90, 90A, or 90B. For example, the technology of the present disclosure is also applied to a powder conveyance device that conveys waste toner, recycled toner, a two-component developer (e.g., a developer containing toner and a carrier), and the like, as the powder.

According to the embodiments, the technology of the present disclosure is applied to the toner supply device 90, 90A, or 90B serving as the powder conveyance device that conveys the toner as the powder from the toner container 32Y as the supplier to the developing device 5Y as the supply destination. However, the supplier and the supply destination that are coupled with the powder conveyance device applied with the technology of the present disclosure are not limited to the toner container 32Y and the developing device 5Y, respectively. Thus, the powder conveyance device may be coupled with various suppliers and supply destinations.

According to the embodiments, the toner container 32Y as the supplier is a bottle including the container body 33 that rotates and discharges the toner. However, the supplier is not limited to the toner container 32Y. For example, the supplier may be a toner container accommodating a conveyor that conveys toner to a discharge port. The supplier may be a toner container having a box shape or the like.

According to the embodiments, the technology of the present disclosure is applied to the toner supply device 90, 90A, or 90B serving as the powder conveyance device that includes two conveyance paths, that is, the first horizontal conveyance path 91 or 91A and the second horizontal conveyance path 92, that accommodate the first conveying screw 71 and the second conveying screw 72, respectively. Alternatively, the technology of the present disclosure is also applied to a powder conveyance device including a single conveyance path accommodating a single conveyor or a powder conveyance device including three or more conveyance paths each of which accommodates a conveyor.

According to the embodiments, the technology of the present disclosure is applied to the toner supply device 90, 90A, or 90B serving as the powder conveyance device incorporating the first horizontal conveyance path 91 or 91A serving as the first conveyance path and the fall path 93 serving as the second conveyance path. However, a relation between the first conveyance path and the second conveyance path is not limited to a relation between the first horizontal conveyance path 91 or 91A and the fall path 93. Alternatively, the powder conveyance device may incorporate a combination of various conveyance paths.

According to the embodiments, the technology of the present disclosure is applied to the toner supply device 90, 90A, or 90B serving as the powder conveyance device incorporating the first horizontal conveyance path 91 or 91A serving as the first conveyance path and the fall path 93 serving as the second conveyance path that intersects the first horizontal conveyance path 91 or 91A at an intersection angle of approximately 90 degrees. However, the intersection angle defined by the first conveyance path and the second conveyance path is not limited to approximately 90 degrees.

The above-described alternatives achieve advantages similar to advantages achieved by the embodiments described above.

The technology of the present disclosure is not limited to the embodiments described above. The embodiments of the present disclosure are modified properly to configurations or constructions other than those suggested in the embodiments described above within the scope of the technology of the present disclosure. The number, the position, the shape, and the like of the components according to the embodiments of the present disclosure are not limited to those suggested in the embodiments described above and are modified to the number, the position, the shape, and the like that are appropriate to achieve the technology of the present disclosure.

A description is provided of advantages of a powder conveyance device (e.g., the toner supply devices 90, 90A, and 90B).

As illustrated in FIGS. 6, 8, 11, and 12, the powder conveyance device includes a conveyor (e.g., the first conveying screw 71), a first conveyance tube (e.g., the first horizontal conveyance paths 91 and 91A), a second conveyance tube (e.g., the fall path 93), a swing member (e.g., the swing members 73 and 73B), and a restrictor (e.g., the projections 91*c*, 95*a*, and 93*a*).

The conveyor rotates in a predetermined rotation direction (e.g., the rotation direction R71) to convey powder. The conveyor is disposed inside the first conveyance tube. The second conveyance tube extends in an angled direction that is angled with respect to the first conveyance tube. The second conveyance tube communicates with the first conveyance tube. The swing member is disposed inside the second conveyance tube. The swing member swings in accordance with rotation of the conveyor. The swing member has one end that is detachably attached to the conveyor such that the swing member is detached in a predetermined detaching direction (e.g., the detaching direction D73 depicted in FIG. 10B). The restrictor is disposed inside the first conveyance tube or the second conveyance tube. For example, the first conveyance tube or the second conveyance tube mounts the restrictor. The restrictor restricts motion of the swing member in the predetermined detaching direction.

Accordingly, the powder conveyance device and an image forming apparatus (e.g., the image forming apparatus 100) incorporating the powder conveyance device prevent the swing member having the one end attached to the conveyor from separating from the conveyor.

According to the embodiments described above, the image forming apparatus 100 is a printer. Alternatively, the image forming apparatus 100 may be a copier, a facsimile machine, a multifunction peripheral (MFP) having at least two of copying, printing, scanning, facsimile, and plotter functions, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, aspects of the present disclosure may be the following set of first to ninth aspects.

First Aspect

A powder conveyance device includes: a conveyor to rotate in a rotation direction to convey powder; a first conveyance path accommodating the conveyor; a second conveyance path extending in an orthogonal direction that intersects the first conveyance path, the second conveyance path communicating with the first conveyance path; a swing member disposed inside the second conveyance path, the swing member to swing in accordance with rotation of the conveyor, the swing member having one end that is detachably attached to the conveyor, the one end to be detached from the conveyor in a detaching direction; and a restrictor disposed inside one of the first conveyance path and the second conveyance path, the restrictor to restrict motion of the swing member in the detaching direction.

Second Aspect

In the powder conveyance device according to the first aspect, the conveyor includes a shaft. The swing member includes a hook disposed at the one end of the swing member. The hook engages the shaft of the conveyor. The restrictor includes a projection disposed opposite the hook. The one of the first conveyance path and the second conveyance path includes an inner wall from which the projection projects toward the hook.

Third Aspect

In the powder conveyance device according to the second aspect, the hook, the shaft of the conveyor, and the projection define a relation of A>B, where A represents an engagement margin for which the hook engages the shaft of the conveyor and B represents a clearance between the projection and the shaft of the conveyor.

Fourth Aspect

In the powder conveyance device according to the second or third aspect, the hook and the projection define a relation of C/2>D, where C represents an inner diameter of the hook and D represents a distance between the hook and the projection.

Fifth Aspect

In the powder conveyance device according to any one of the first to fourth aspects, the restrictor is detachably attached to the one of the first conveyance path and the second conveyance path.

Sixth Aspect

In the powder conveyance device according to any one of the first to fifth aspects, the swing member swings in an extending direction in which the second conveyance path extends.

Seventh Aspect

In the powder conveyance device according to any one of the first to sixth aspects, the restrictor is disposed at a position at which the restrictor does not contact the swing member that swings and at which the restrictor does not contact the conveyor that rotates.

Eighth Aspect

In the powder conveyance device according to any one of the first to seventh aspects, the first conveyance path is a horizontal conveyance path, and the second conveyance path defines a fall path.

Ninth Aspect

An image forming apparatus includes the powder conveyance device according to any one of the first to eighth aspects.

The invention claimed is:

1. A powder conveyance device comprising:

a conveyor to rotate in a rotation direction to convey powder;

a first conveyance tube accommodating the conveyor;

a second conveyance tube extending in an angled direction that is angled with respect to the first conveyance tube, the second conveyance tube communicating with the first conveyance tube;

a swing member disposed inside the second conveyance tube, the swing member to swing in accordance with rotation of the conveyor, the swing member having one end that is detachably attached to the conveyor, the one end to be detached from the conveyor in a detaching direction; and a restrictor disposed inside one of the first conveyance tube and the second conveyance tube, the restrictor to restrict motion of the swing member in the detaching direction, wherein the restrictor does not contact the swing member that swings and the conveyor that rotates.

2. The powder conveyance device according to claim 1, wherein:

the conveyor includes a shaft, and the swing member includes a hook disposed at the one end of the swing member, the hook to engage the shaft of the conveyor.

3. The powder conveyance device according to claim 2, wherein;

the restrictor includes a projection disposed opposite the hook, and the one of the first conveyance tube and the second conveyance tube includes an inner wall from which the projection projects toward the hook.

4. The powder conveyance device according to claim 3, wherein;

the hook, the shaft of the conveyor, and the projection define a relation of A>B, where A represents an engagement margin for which the hook engages the shaft of the conveyor and B represents a clearance between the projection and the shaft of the conveyor.

5. The powder conveyance device according to claim 3, wherein;

the hook and the projection define a relation of C/2>D, where C represents an inner diameter of the hook and D represents a distance between the hook and the projection.

6. A powder conveyance device, comprising:

a conveyor to rotate in a rotation direction to convey powder;

a first conveyance tube accommodating the conveyor;

a second conveyance tube extending in an angled direction that is angled with respect to the first conveyance tube, the second conveyance tube communicating with the first conveyance tube;

a swing member disposed inside the second conveyance tube, the swing member to swing in accordance with rotation of the conveyor, the swing member having one end that is detachably attached to the conveyor, the one end to be detached from the conveyor in a detaching direction; and a restrictor disposed inside one of the first conveyance tube and the second conveyance tube, the restrictor to restrict motion of the swing member in the detaching direction, wherein:

the conveyor includes a shaft, the swing member includes a hook disposed at the one end of the swing member, the hook to engage the shaft of the conveyor, the shaft of the conveyor includes:

a shaft portion; and an eccentric portion having a shaft center that is eccentric with respect to a shaft center of the shaft portion, and the hook engages the eccentric portion loosely.

7. The powder conveyance device according to claim 6, wherein:

the conveyor further includes a plurality of increased diameter portions between which the eccentric portion is interposed, and each of the increased diameter portions has an outer diameter that is greater than an outer diameter of the eccentric portion.

8. The powder conveyance device according to claim 1, wherein:

the restrictor is detachably attached to the one of the first conveyance tube and the second conveyance tube.

9. A powder conveyance device, comprising:

a conveyor to rotate in a rotation direction to convey powder;

a first conveyance tube accommodating the conveyor;

a second conveyance tube extending in an angled direction that is angled with respect to the first conveyance tube, the second conveyance tube communicating with the first conveyance tube;

a swing member disposed inside the second conveyance tube, the swing member to swing in accordance with rotation of the conveyor, the swing member having one end that is detachably attached to the conveyor, the one end to be detached from the conveyor in a detaching direction; and a restrictor disposed inside one of the first conveyance tube and the second conveyance tube, the restrictor to restrict motion of the swing member in the detaching direction, wherein the restrictor is detachably attached to the one of the first conveyance tube and the second conveyance tube, the powder conveyance device further comprising a cover mounting the restrictor, wherein the first conveyance tube has a through-hole covered by the cover, and wherein the restrictor is inserted into the first conveyance tube through the through-hole.

10. The powder conveyance device according to claim 1, wherein:

the swing member swings in an extending direction in which the second conveyance tube extends.

11. The powder conveyance device according to claim 1, wherein;

the first conveyance tube defines a horizontal conveyance path through which the powder is conveyed horizontally, and the second conveyance tube defines a fall path through which the powder falls.

12. The powder conveyance device according to claim 1, wherein:

the conveyor includes a screw.

13. The powder conveyance device according to claim 1, wherein:

the swing member includes a coil.

14. An image forming apparatus comprising:

a developing device to form an image; and the powder conveyance device according to claim 1.

15. An image forming apparatus comprising:

the powder conveyance device according to claim 6.

16. An image forming apparatus comprising:

the powder conveyance device according to claim 9.

17. The powder conveyance device according to claim 6, wherein:

the restrictor does not contact the swing member that swings and the conveyor that rotates.

18. The powder conveyance device according to claim 9, wherein:

the restrictor does not contact the swing member that swings and the conveyor that rotates.

* * * * *